A. B. HOWLAND.
Lamp.
No. 94,961.
Patented Sept. 21, 1869.
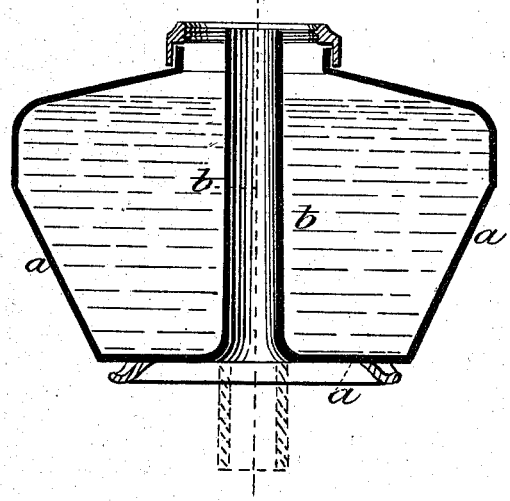
Witnesses:
C. B. Odiorne
Charles E. Abbott.
Inventor:
Andrew B. Howland.

United States Patent Office.

ANDREW B. HOWLAND, OF TITUSVILLE, PENNSYLVANIA.

Letters Patent No. 94,961, dated September 21, 1869.

IMPROVEMENT IN ARGAND-LAMPS.

The Schedule referred to in these Letters Patent and making part of the same.

*To all whom it may concern:*

Be it known that I, ANDREW B. HOWLAND, of the city of Titusville, county of Crawford, and State of Pennsylvania, have invented certain new and useful Improvements in Argand-Lamps; and I do hereby declare that the following is a full, clear, and exact description thereof, reference being had to the accompanying drawings, which form a part of this specification.

My invention relates to the class of lamps in which an annular wick is used, commonly denominated "argand-lamps," and in which the air is supplied to the interior surface of the flame through an open vertical tube extending from the bottom of the lamp to the centre of the flame. Such lamps were originally made entirely of metal, but were too expensive for common use. They have also been made with a glass bulb or oil-reservoir, through which air was supplied by means of a central metal tube, the joint at the bottom of the lamp being made tight by cement. By the latter arrangement, the cost of the lamp was materially reduced, and it gave satisfaction so long as camphene, resin, whale-oil, &c., were used; but, since the introduction and almost universal use of kerosene for illuminating-purposes, it cannot be used, as no cement has been found by which a joint between glass and metal can be made impervious to kerosene.

In order to overcome the latter difficulty, and also to furnish an argand-lamp at about the same cost of ordinary flat-wick lamps, I make the entire body of the lamp, including the central air-tube, of glass, as shown in the drawing, which represents a vertical section of a lamp usually called a "font-lamp," and in which $a$ is the body of the lamp, surmounted by a metal collar, into which the burner is screwed.

$b$ is the central tube, open throughout its entire length, for supplying air to the interior surface of the annular flame.

I make said tube also of glass, connected solidly with the body $a$ at the bottom, so that it shall form a part of the same.

The tube should extend to about the top of the metal collar, or high enough to prevent any overflow of oil; and the upper end of the tube should be concentric with the collar, the burner and wick being introduced through the collar, and outside of and around the glass tube.

The lamp should be provided with a side aperture, for convenience in filling.

In case the body $a$ is to be placed upon a metal pedestal, as in table-lamps, the glass tube may be extended downward, as shown in dotted lines, and the pedestal attached thereto.

In the case of wall-lamps, for halls, &c., the tube $b$ and the burner, opening at the top, may be near the edge of the lamp, instead of in the centre, so as to throw but little shadow upon the floor.

The lamp may be provided with feet, if necessary.

I am aware of the existence of a patent, issued, December 31, 1867, to A. P. Tyler, in which two flat glass tubes are arranged to convey artificial currents of air from a central conical chamber to either side of a flat wick, the object being to avoid the use of a chimney; but I distinctly disclaim such an arrangement.

What I claim as my invention, and desire to secure by Letters Patent, is—

As a new article of manufacture, a glass lamp, with a central glass tube, concentric with the burner, opening at the top, substantially as and for the purposes set forth.

ANDREW B. HOWLAND.

Witnesses:
   C. B. ODIORNF,
   CHARLES E. ABBOTT.